(12) United States Patent
Polad

(10) Patent No.: US 9,962,993 B2
(45) Date of Patent: May 8, 2018

(54) BRAKE MECHANISM FOR MOBILE CURRENCY VAULTS

(71) Applicant: Alan Polad, Santa Fe Springs, CA (US)

(72) Inventor: Alan Polad, Santa Fe Springs, CA (US)

( * ) Notice: Subject to any disclaimer, the term of this patent is extended or adjusted under 35 U.S.C. 154(b) by 552 days.

(21) Appl. No.: 14/541,406

(22) Filed: Nov. 14, 2014

(65) Prior Publication Data

US 2016/0136997 A1 May 19, 2016

(51) Int. Cl.
*B60B 33/00* (2006.01)
*E05G 1/02* (2006.01)
*E05G 1/00* (2006.01)

(52) U.S. Cl.
CPC .......... *B60B 33/0086* (2013.01); *E05G 1/005* (2013.01); *E05G 1/02* (2013.01)

(58) Field of Classification Search
CPC . B60B 33/021; B60B 33/025; B60B 33/0086; B60B 33/0092; B60B 33/026; B60B 33/0078; B60B 33/02; B60B 33/0084; B62B 5/0423; B62B 5/04; B62B 5/0457; E05G 1/005; E05G 1/02
USPC ....................................................... 188/1.12
See application file for complete search history.

(56) References Cited

U.S. PATENT DOCUMENTS

| | | | | |
|---|---|---|---|---|
| 5,205,381 A * | 4/1993 | Mehmen | ................... | B62B 5/04 188/1.12 |
| 5,439,069 A * | 8/1995 | Beeler | ................... | B62B 3/1404 180/11 |
| 5,531,295 A * | 7/1996 | Kopman | ................... | B60T 1/04 188/17 |
| 5,839,546 A * | 11/1998 | Yan | ......................... | B60T 1/005 188/1.12 |
| 5,983,614 A * | 11/1999 | Hancock | ................ | A01D 75/28 16/35 R |
| 6,125,972 A * | 10/2000 | French | .................... | B62B 5/049 188/1.12 |
| 6,152,476 A * | 11/2000 | Huang | ...................... | B62B 7/08 188/20 |
| 6,220,379 B1 * | 4/2001 | Schugt | ................ | B60L 11/1816 180/65.1 |
| 6,244,366 B1 * | 6/2001 | Otterson | ............... | B62B 3/1404 180/11 |
| 6,409,187 B1 * | 6/2002 | Crow, Jr. | .................. | B62B 5/04 188/20 |

(Continued)

FOREIGN PATENT DOCUMENTS

GB              593830 A  * 10/1947  ............... B62B 5/04

*Primary Examiner* — Anna M Momper
*Assistant Examiner* — Mahbubur Rashid
(74) *Attorney, Agent, or Firm* — Edwin Tarver

(57) ABSTRACT

A brake mechanism for mobile currency vaults includes a braking gear coupled to a vault wheel to govern rotational movement of the wheel. An interference tab is biased to an interference fit between the gear's teeth to stop rotation of the wheel. Disengaging the gear is controlled near the handles of the vault, which also provide steering control, so that users must actively disengage the interference tab to allow the wheel to rotate. The brake mechanism also has a brake release for locking in a disengaged or engaged position. The brake release spans the mobile currency vault from a front wheel to a rear handle. The brake release also has a control, preferably at a rear end of the vault, requiring activation by a key and an indicator pusher.

18 Claims, 9 Drawing Sheets

(56) References Cited

U.S. PATENT DOCUMENTS

| | | | | |
|---|---|---|---|---|
| 7,337,890 B2* | 3/2008 | Bochonok | ................. | G07F 9/06 |
| | | | | 188/19 |
| 2001/0028301 A1* | 10/2001 | Geiger | ................. | B62B 3/1408 |
| | | | | 340/5.91 |
| 2005/0194719 A1* | 9/2005 | Jordan | .................... | B29C 51/02 |
| | | | | 264/322 |
| 2006/0102435 A1* | 5/2006 | Chiang | ................. | A45C 5/145 |
| | | | | 188/19 |
| 2010/0175222 A1* | 7/2010 | Fallshaw | ............ | B60B 33/0021 |
| | | | | 16/35 R |
| 2013/0194072 A1* | 8/2013 | Kim | ........................ | G08B 5/36 |
| | | | | 340/6.1 |

* cited by examiner

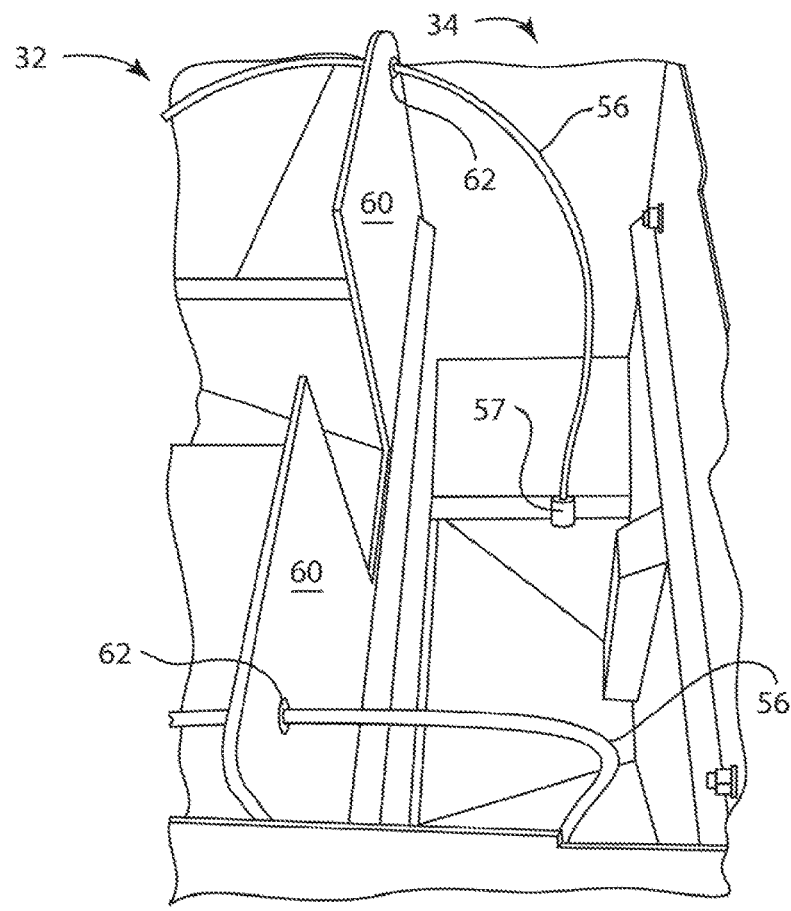
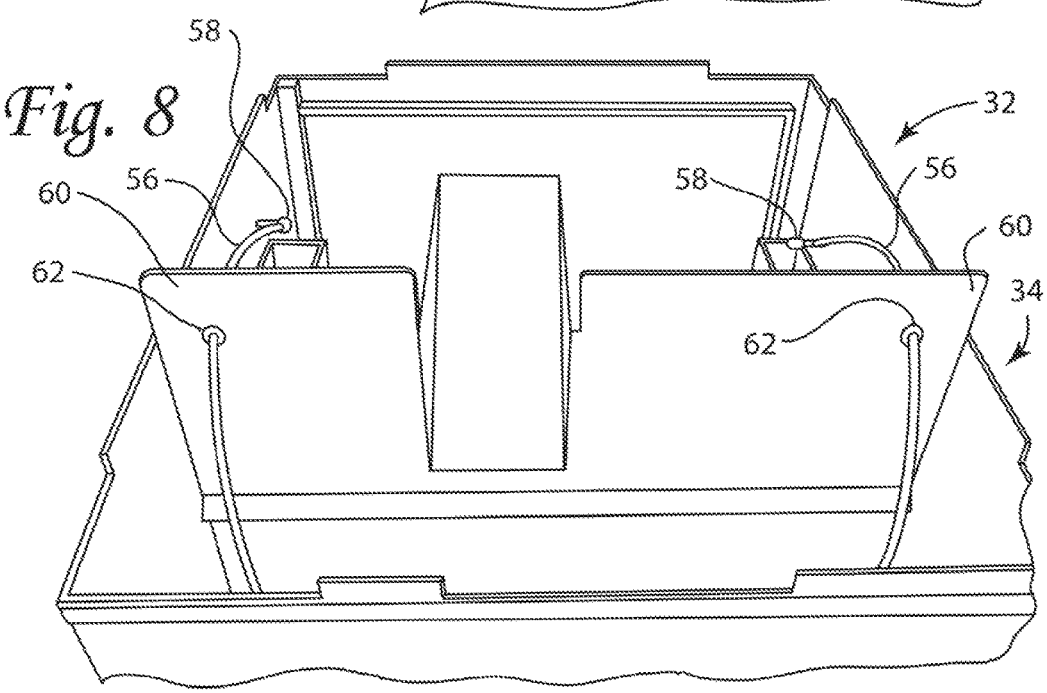

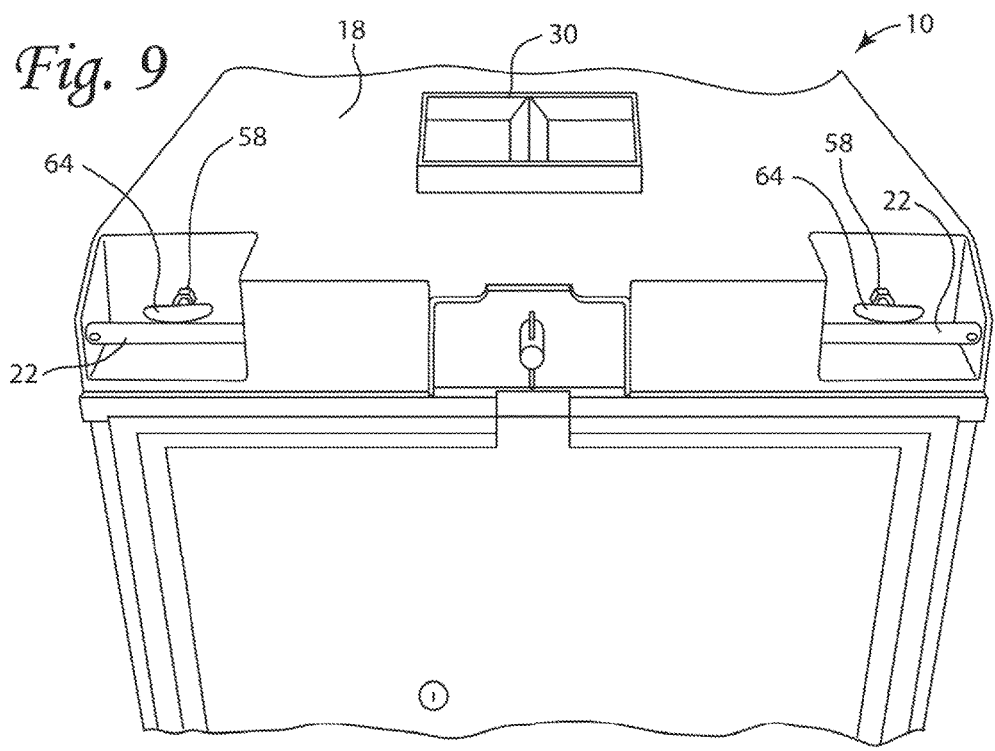
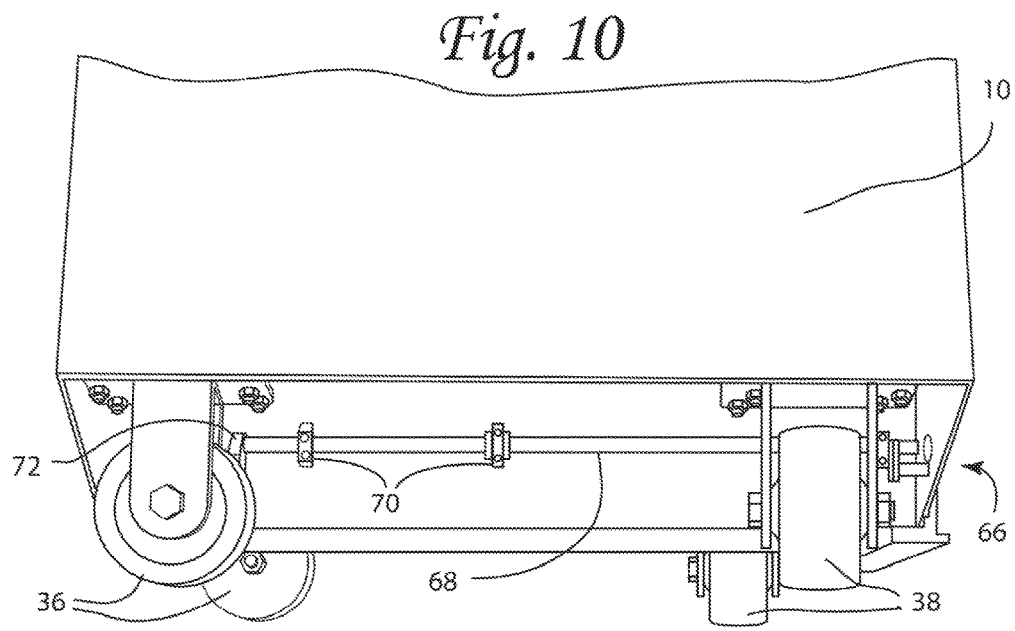

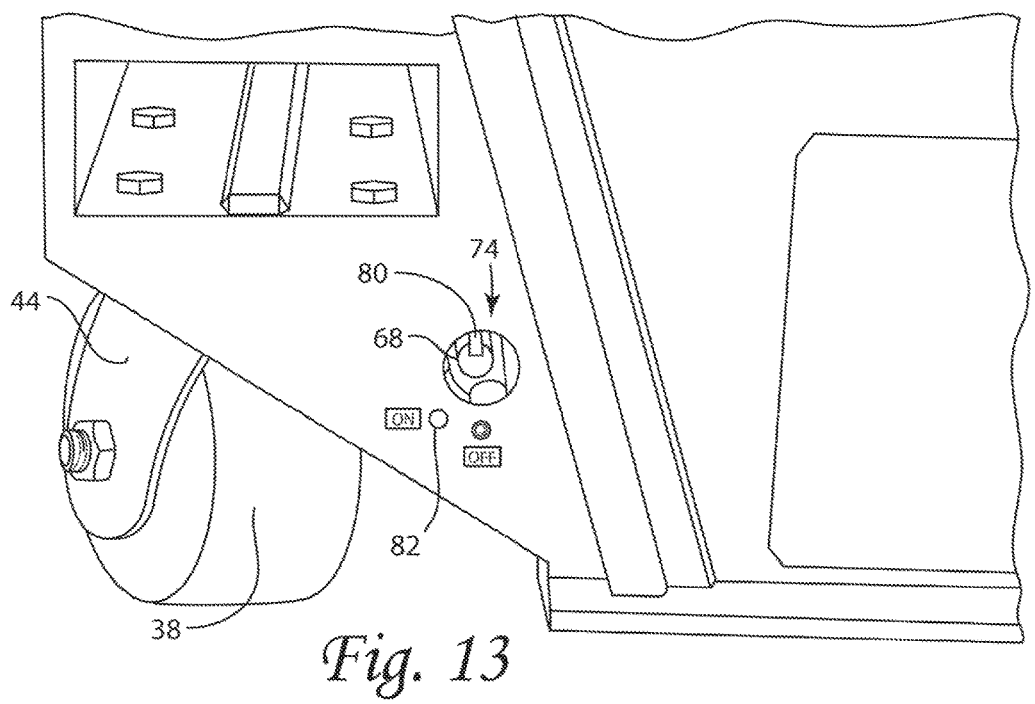
Fig. 13
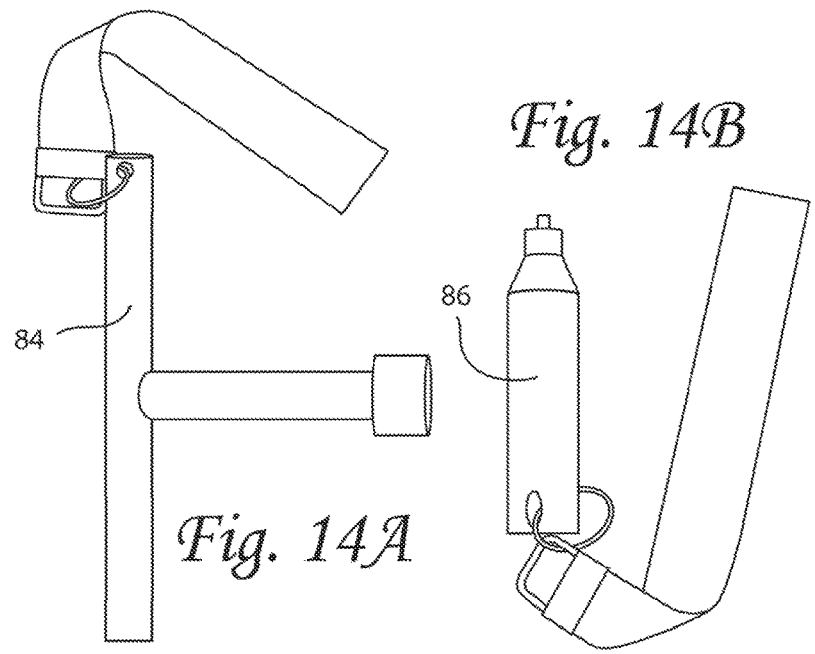
Fig. 14A
Fig. 14B

BRAKE MECHANISM FOR MOBILE CURRENCY VAULTS

BACKGROUND

Municipal and other public transit agencies typically accept both electronic and hard currency transactions. Hard currency collection systems remain in use, in part due to national rules governing transit operations. These regulations are imposed as a condition for receiving federal transportation funds, and govern not only how revenue is collected but also how hard currency is stored and handled after collection. Bills and coins are typically transferred into secure vaults and later moved to banking facilities. The vaults' specifications mandate particular designs and construction materials, making them very difficult to tamper with or break into but also very heavy.

Mobile vaults having wheels have been developed allowing allow workers to move them without the assistance of heavy machinery such as forklifts, etc. Mobile vaults typically have a front set of wheels mounted on a static fork, and a rear set of wheels on a swiveling fork. Handles at the rear of the mobile vault above the rear wheels allow operators to steer and maneuver the vaults around tight corners and into confined spaces despite their heavy weight, particularly when filled with coinage. Although movement is made easier, mobile vaults suffer from the drawback that once in motion, inertia makes it difficult to slow down or bring them to a stop. They are also prone to unexpectedly move on any remotely slanted surface, while traveling aboard a moving vehicle, or when otherwise urged by gravity into motion.

The difficulty in slowing down and stopping mobile vaults can result in damage to objects and obstacles caught in the path of a moving mobile vault, injury to persons struck by a moving mobile vault, and occasionally damage or destruction of the vault itself, for instance if allowed to roll off a loading dock, or otherwise fall from even a very low height. Currently there is no method of controlling or hindering the motion of mobile currency vaults other than bringing force to bear on the handles, which is frequently insufficient to avoid the aforementioned types of damage and injury.

It is therefore an object of the present invention to provide a motion control system for mobile currency vaults. Another object of the invention is to provide an automatic system designed to default a mobile currency vault to a non-moving configuration. Another object of the invention is to include a system having a deactivation capability, allowing users to set a mobile currency vault to a default stopped, or default moving configuration. Yet another object of the invention is to provide a motion control system built to tolerances satisfying federal specification requirements for mobile currency vaults. These and other objects of the invention are more fully explained in the following summary, description and claims.

SUMMARY

A brake mechanism for mobile currency vaults includes a braking gear coupled to a wheel of the mobile currency vault. The braking gear governs rotational movement of the wheel and includes a plurality of teeth. An interference tab is biased to an interference fit between the teeth and movable under tension to disengage from the braking gear. The brake mechanism is controlled with brake controls adjacent one or more handles of the mobile currency vault, the handle providing steering control of the mobile currency vault. The brake control is in communication with the interference tab by a connection housed within a locked portion of the mobile currency vault. Under this arrangement, a user must activate the brake control in order to disengage the interference tab from the braking gear to allow the wheel to rotate.

The brake mechanism may have the wheel and the braking gear located adjacent a bottom front portion of the mobile currency vault. Additionally, the wheel and the braking gear may be housed between non-swiveling forks at the bottom front portion of the mobile currency vault. To provide adequate stopping power, the teeth of the braking gear may have substantially vertical pressure angles. More particularly, a fillet at a base of the teeth orients a tooth flank and a bottom land of the brake gear at substantially ninety degrees.

In a preferred embodiment, the interference tab extends from an articulating beam that spans the fork, and the articulating beam is disposed above the wheel and the braking gear. The connection between the articulating beam and the brake control can be a sleeved cable. The connection may also span a lower front portion and an upper rear portion of the mobile currency cart. At the other end, the brake control may be a T handle or similarly shaped handle conducive to easy grasping.

The brake mechanism also has a brake release for locking the brake mechanism in a disengaged or engaged position. The brake release is coupled to the interference tab when activated, and spans the mobile currency vault from a front wheel to a rear handle. The brake release mechanism comprises a brake release control, preferably at a rear end of the mobile currency vault. For security, the brake release control may require activation by a key and an indicator pusher.

The mobile currency vault may also be characterized as having a body with a lower front end and an upper rear end. A wheel is adjacent the lower front end, and a braking gear is coupled or coupled to the wheel. An interference tab is provided, biased to engage the braking gear thereby preventing rotation of the wheel. A brake control is disposed adjacent the upper rear end, with the brake control coupled to the interference tab and movable from a resting position to an actuated position. Moving the brake control from the resting position to the actuated position disengages the interference tab from the braking gear, thereby allowing the wheel to turn.

Preferably the wheel is mounted on a stationary caster, and the interference tab is part of an articulating beam extending through a fork holding the wheel for disengaging the interference tab from the braking gear. The brake control may be coupled to the interference tab by a cable inside the mobile currency vault. A release mechanism is provided for disengaging the interference tab from the braking gear, and preferably includes a key and an indicator pusher for activating the release mechanism.

BRIEF DESCRIPTION OF THE FIGURES

FIG. 7 is perspective view of brake cables arranged in the mobile currency vault.

FIG. 8 is a perspective view of the brake cables installed in the mobile currency vault with the lid removed.

FIG. 9 is a perspective view of the rear of the mobile currency vault with brake handles installed on the lid adjacent the handles.

FIG. 10 is a side perspective view of the undercarriage of the mobile currency vault having a brake release mechanism.

FIG. 13 is a perspective view of the rear of the mobile currency vault showing a brake release mechanism interface and indicator.

FIG. 14A is a top view of a brake release key.

FIG. 14B is a top view of an indicator pusher.

Figure 1:
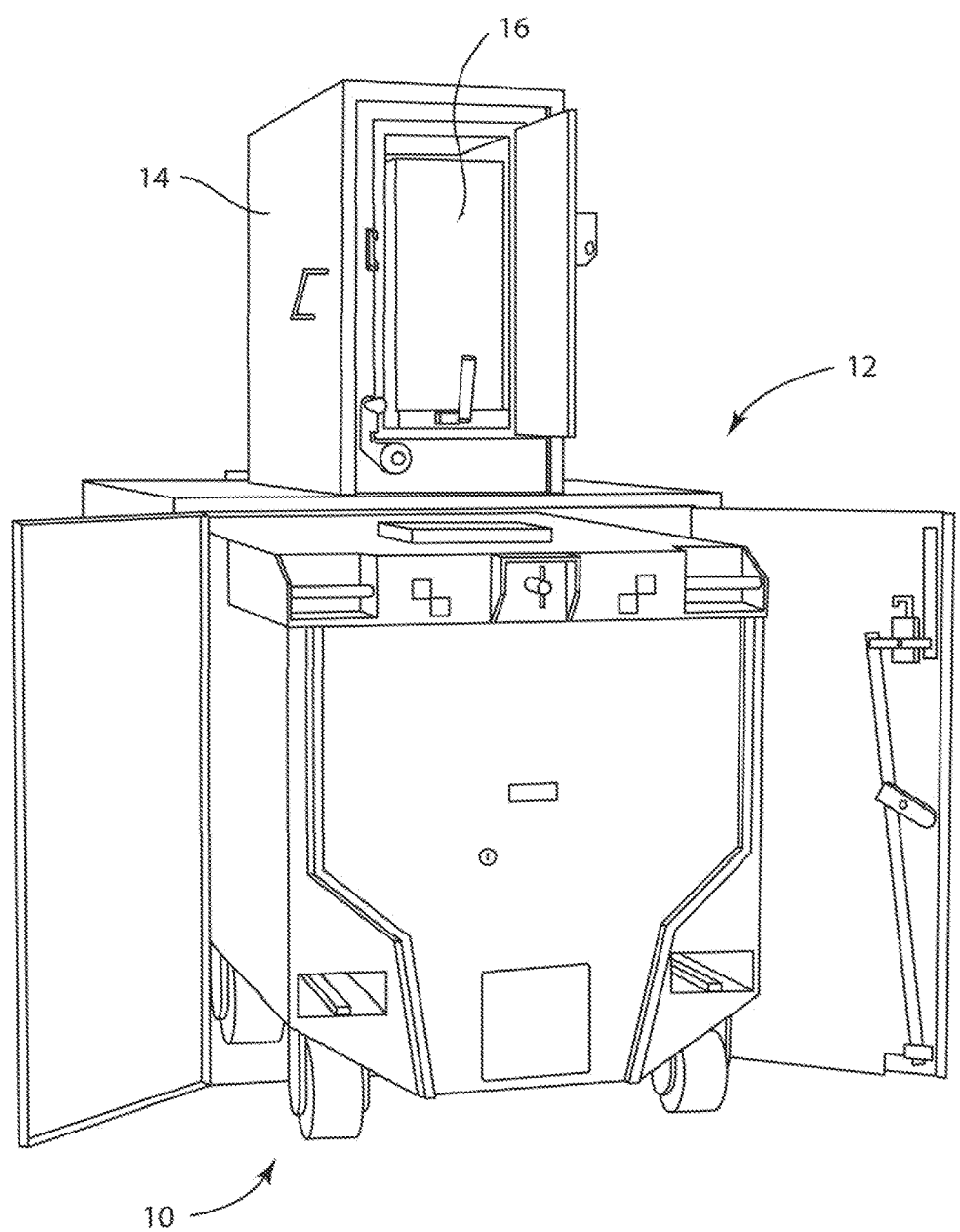
FIG. 1 is a perspective view of a mobile currency vault partially housed in a vault enclosure.

REFERENCE NUMBERS 10. mobile currency vault
12. vault enclosure
14. cashbox receiver
16. cashbox
18. lid
20. lid release
22. cart handle
24. body
26. front end
28. rear end
30. currency inlet
32. bill receptacle
34. coin receptacle
36. front wheel
38. rear wheel
40. brake gear
42. tooth
43. anchoring bolt
44. fork
46. spring anchor
48. spring
50. interference beam
51. hinge
52. interference tab
54. cable connector
56. brake cable
57. cable anchor
58. brake handle connector
60. currency separator
62. cable port
64. brake handle
66. brake release
68. brake release rod
70. brake release bushing
72. offset
74. access port
76. indicator
78. release lever
80. notch
82. brake release indicator window
84. brake release key
86. indicator pusher
88. reduced torque handle
90. post
92. lever
94. recess

Description

Referring to FIG. 1, a mobile currency vault 10 is shown in a vault enclosure 12. Currency (not shown) in the form of coin and bills are introduced into the vault 10 for transport, and flows into the vault enclosure 12 from a cashbox receiver 14, into which a cashbox 16 is inserted. This typically occurs in a public transit context when the cashbox 16 is removed from a fare box (not shown) of a vehicle such as a bus, and inserted into the cashbox receiver 14. Once the cashbox receiver 14 accepts the cashbox 16, it mechanically opens the cashbox 16 inside the cashbox receiver 14 and empties currency into the mobile currency vault 10, keeping coins separate from the bills in the process. The cashbox receiver 14 then closes and locks the cashbox 16 allowing it to be returned to the fare box, and the mobile currency vault 10 is removed from the vault enclosure 12 for transporting the currency to a secure location.

Figure 2:
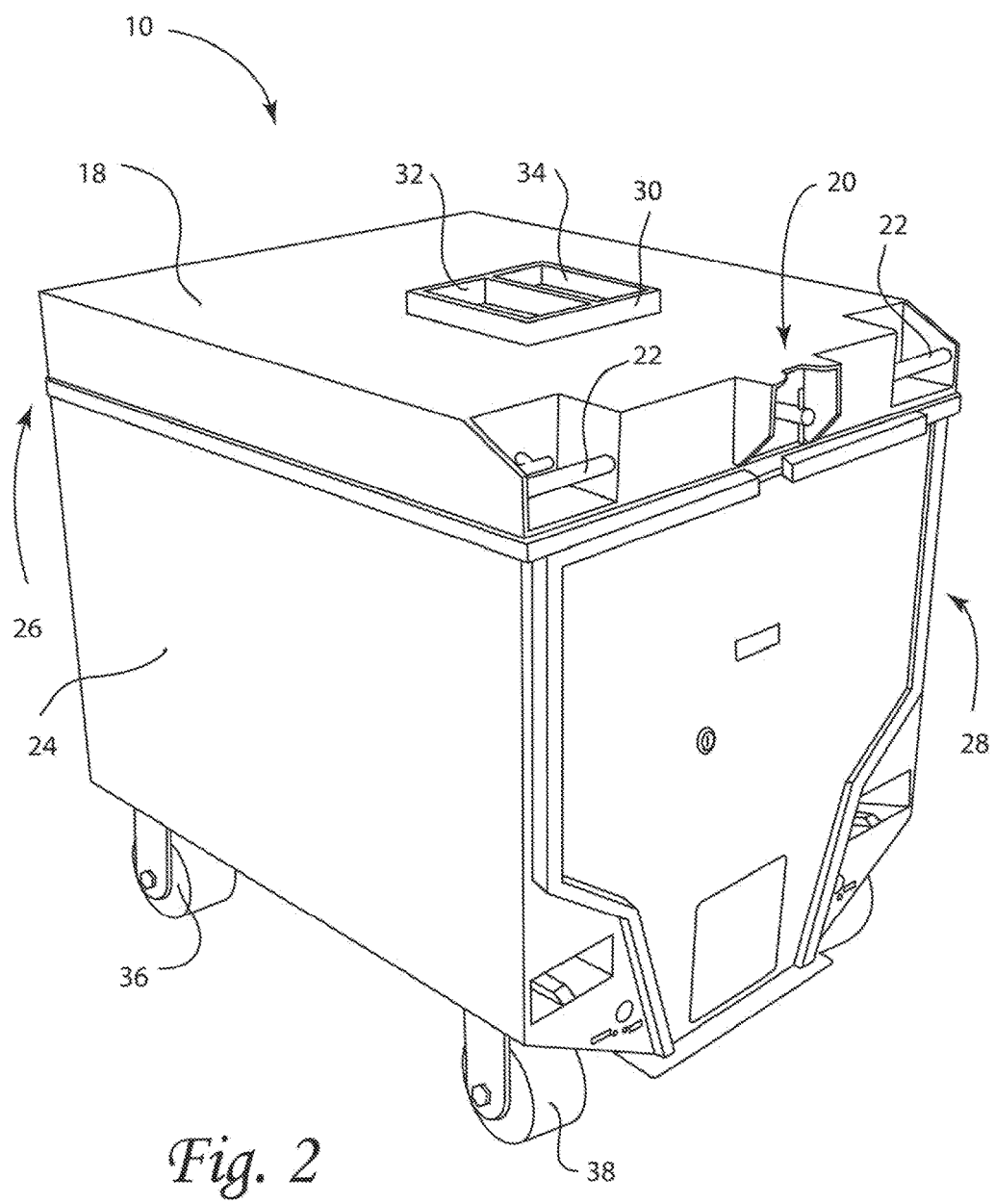
FIG. 2 is a perspective view of the mobile currency vault.

Referring to FIG. 2, the mobile currency vault 10 has a lid 18 with a lid release 20 for opening the lid 18, and cart handles 22 for driving and steering the mobile currency vault 10. The lid 18 includes a currency inlet 30 for accepting currency from the cashbox 16, the currency inlet 30 including a bill receptacle 32 and a coin receptacle 34. The body 24 houses the currency, and includes a front end 26 and a rear end 28. Front wheels 36 are located adjacent the front end 26, and rear wheels 38 are located adjacent the rear end 28. Due to the weight of the mobile currency vault 10, particularly when filled, the front wheels 36 are locked in a single forward-and-reverse direction, while the rear wheels 38 are able to swivel to provide for accurate and controlled steering. Because the swiveling rear wheels 38 are directly under the cart handles 22, greater steering control is achieved.

Figure 3:
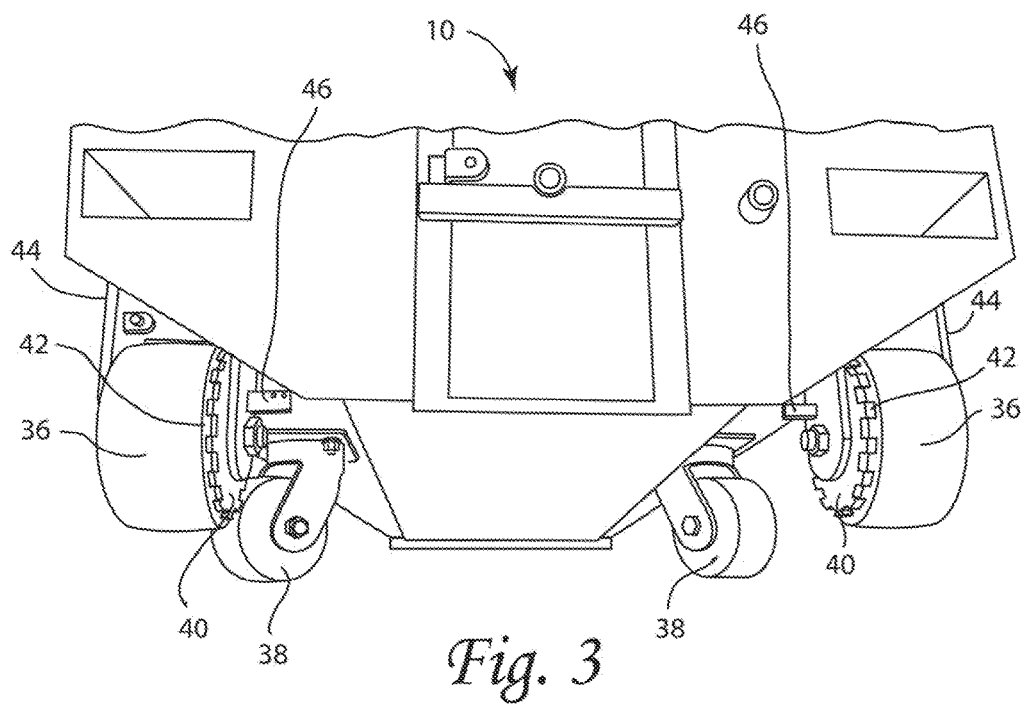
FIG. 3 is a perspective view of the undercarriage of the mobile currency vault showing a brake system.

Referring to FIG. 3, although having the rear wheels 38 under the cart handles 22 (FIG. 2) provides better steering control, the weight of the mobile currency vault 10 makes it difficult to stop, to control on slanted surfaces, and risks injury if it is allowed to drift, roll away, or coast in an uncontrolled manner. For this reason a brake gear 40 having a plurality of teeth 42 is coupled to the front wheels 36 of the mobile currency vault 10. Because the front wheels 36 do not swivel, they are preferred over the rear wheels 38 for mounting the brake gear 40. This arrangement ensures the mobile currency vault 10 stops in the shortest distance possible when the front wheels 36 stop rolling. A brake gear 40 is preferably mounted directly to each front wheel 36.

Figure 4:
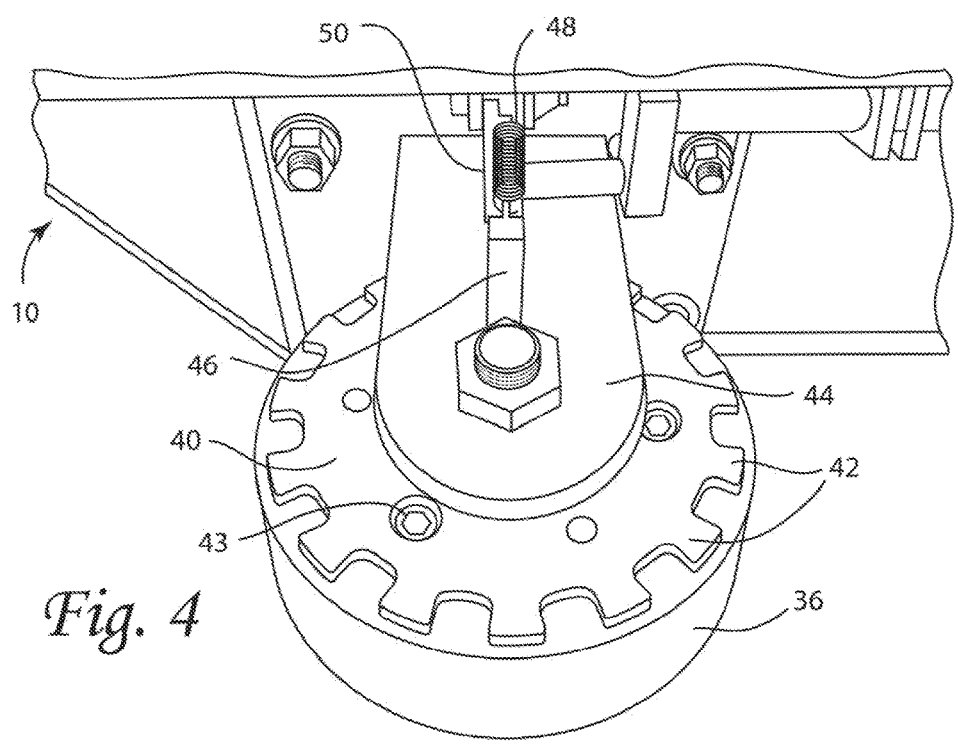
FIG. 4 is a perspective view of a mobile currency vault wheel having an interference fit braking mechanism.

Referring to FIG. 4, each brake gear 40 may be mounted to each front wheel 36 using anchoring bolts 43, and is mounted in a way that prevents the teeth 42 from extending past the front wheel 36. The brake gear 40 is mounted inside the fork 44 holding the front wheel 36 in position. A spring anchor 46 is located on each fork 44 for retaining one or more springs 48. The springs 48 are coupled at the opposite end from the spring anchor 46 to an interference beam 50, which extends across the fork 44.

Figure 5:
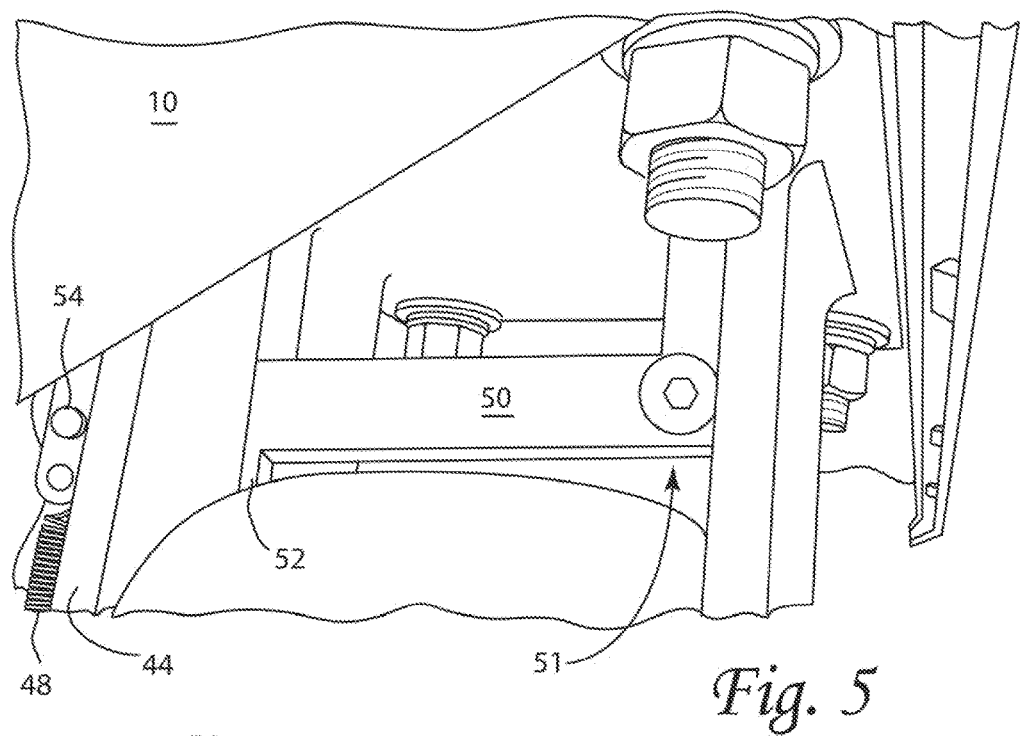
FIG. 5 is a perspective view of a braking system beam featuring an interference fit beam.

Referring to FIG. 5, the interference beam 50 is attached on each fork 44 opposite a hinge 51. The side of the fork 44 nearest the spring 48 is slotted, thereby allowing the interference beam 50 to articulate up and down, while persistently urged toward a maximum downward position by the spring 48. A cable connector 54 is also coupled to the interference beam 50. In order to engage a brake gear 40 (not shown), the interference beam 50 has an interference tab 52 depending downward from the interference beam 50 to engage the teeth 42 (not shown) of the brake gear 40. By obstructing the teeth 42 of the brake gear 40, the interference tab 52 stops the front wheel 26 from rotating. Because the interference beam 50 is persistently urged to a downward position, the interference tab 52 engages the brake gear 40, preventing it from rotating, unless the interference beam 50 is lifted up under pressure overcoming the springs 48. For this reason, the brake system for the mobile currency vault 10 is continually "on" unless disengaged by a user.

Figure 6:
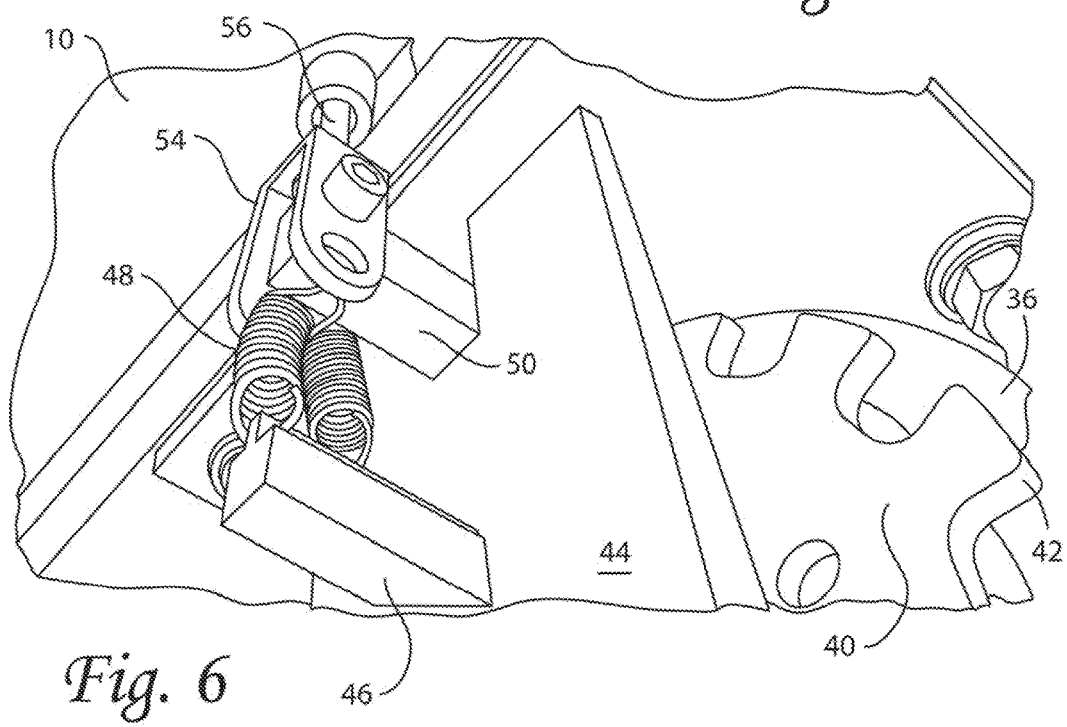
FIG. 6 is a perspective view of a biasing mechanism for an interference beam.

Referring to FIG. 6, the cable connector 54 is coupled to a brake cable 56. The brake cable 56 travels into and through the mobile currency vault 10 to avoid outside interference, or tampering with the brake system. The interference beam 50 may reach its maximum upward position when the cable connector 54 reaches the mobile currency vault 10 and prevents further upward movement. The fork 44 is slotted such that the fork 44 blocks downward travel of the interference beam 50 past a predetermined point, preferably coinciding with the interference tab 52 (not shown) engaging the teeth 42 of the brake gear 40. In one embodiment, the teeth 42 are designed with a sufficient working depth, face flank, and fillets, so that the interference tab 52 slips quickly and easily to the bottom of a tooth 42, to avoid slipping between teeth 42, thereby brining the front wheel 36 to an immediate stop when engaged.

Referring to FIG. 7, the brake cables 56 run through the inside of the mobile currency vault 10, from just above the front wheels 36 (not shown) to the cart handles 22 (not shown). The brake cables 56 are preferably sleeved, and where they enter the mobile currency vault 10 are anchored with cable anchors 57, allowing the brake cables 56 to move within their sleeves. The brake cables 56 preferably travel past the currency separator 60 dividing the interior of the mobile currency vault 10 into coin and bill portions, in one embodiment passing through the currency separator 60 via cable ports 62. In various embodiments, any number and position of cable ports 62 may be employed allowing the brake cables 56 to extend through the mobile currency vault 10 interior in a variety of configurations according to preference.

Referring to FIG. 8, each brake cable 56 terminates at a brake handle connector 58 on the end opposite the cable anchors 57. The brake handle connectors 58 are designed to engage the lid 18 (not shown) on the inside of the mobile currency vault 10, adjacent the cart handles 22 (not shown), and anchoring the brake cables 56 thereto. Control of the brake cables 56 is disposed adjacent the cart handles 22. When a brake cable 56 is urged out of the brake handle connector 58 by a user, movement of the brake cable 56 articulates the biased interference beam 50 upward, clearing the interference tab 52 from the teeth 42 of the brake gear 40, thereby permitting the brake gear 40 and front wheel 36 to turn, allowing the mobile currency vault 10 to be moved.

Referring to FIG. 9, the brake handle connectors 58 are located on the lid 18 of the mobile currency vault 10, adjacent the cart handles 22. Although the mobile currency vault 10 typically has no braking system when manufactured, the brake handle connectors 58 may be installed by locating two small diameter holes on the lid 18 in hand recesses of the cart handles 22. In one embodiment the brake cables 56 preferably extend out of their sleeves at the brake handle connectors 58 and have threaded ends for coupling to brake handles 64.

The brake handles 64 are ideally shaped so that users can easily operate the brake system when moving a mobile currency vault 10. In the illustrated embodiment T-handles are shown, since they allow a user to extend their fingers around both a cart handle 22 and a T-handle shaped brake handle 64. In such an arrangement, the user may easily hold the interference beam 50 away from the brake gear 40 when pushing the mobile currency vault 10, and if a hand slips away or for any other reason disengages the cart handle 22, the mobile currency vault 10 will immediately and automatically stop.

Referring to FIG. 10, in addition to the biased stopping mechanism, comprising the brake handles 64, brake cables 56, biased interference beam 50 and brake gear 40 mechanism (among other related components), the brake system includes a brake release 66, allowing users to deactivate the brake system if desired, such as when the mobile currency vault 10 is empty or stored for quick retrieval. The brake release 66 includes a brake release rod 68 for transmitting control of the brake release 66 from the rear end 28 of the cart to the front wheels 36. The brake release rod 68 is preferably held in position with a series of brake release bushings 70 that allow rotational movement in the brake release rod 68. At the end of the brake release rod 68 closest to the front wheel 36, an offset 72 translates rotational movement in the brake release rod 68 into up and down movement.

Figure 11:
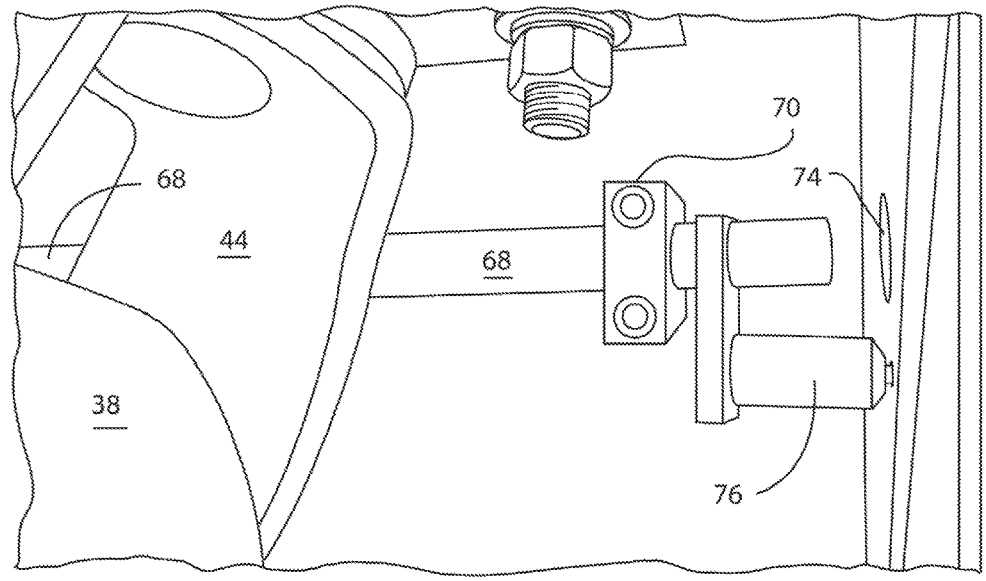
FIG. 11 is a perspective view of a locking adjustment for the brake release mechanism.

Referring to FIG. 11, controlling the brake release 66 is accomplished through an access port 74 near the bottom of the rear end 28 of the mobile currency vault 10 body 24. An indicator 76 coupled to the brake release rod 68 includes a biased bearing to both indicate whether the mobile currency vault 10 is locked or not, and to preserve the mobile currency vault 10 in a locked or an unlocked condition.

Figure 12:
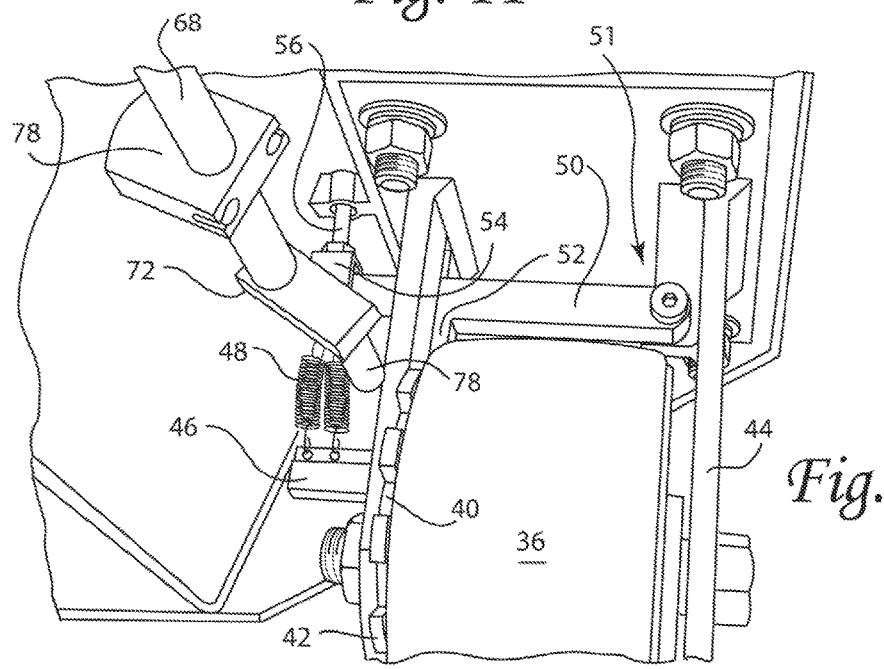
FIG. 12 is a perspective view of the brake release mechanism engaging the interference fit brake mechanism.

Referring to FIG. 12, the brake release 66 interfaces with the interference beam 50 to permanently disengage the interference tab 52 from the brake gear 40. The brake release rod 68 is attached to the offset 72 at one end, and at the other a release lever 78 extends from the offset 72. When a user rotates the brake release rod 68 to release the brake system, the offset 72 causes the release lever 78 to move up, engaging the bottom of the interference beam 50 and causing it to rise up against the biasing forces of the spring 48.

Referring to FIG. 13, a keyed operation is preferable for the brake system to prevent unauthorized persons from changing its settings. To prevent unregulated changing of the brake release 66 setting, the brake release rod 68 includes a notch 80, or similar structure, at the terminal end of the brake release rod 68 adjacent the access port 74 that must be engaged with a special tool (not shown). To preserve the brake release 66 in either an ON or OFF position, the indicator 76 urges its ball bearing into one of two brake release indicator windows 82 on the mobile currency vault 10 body 24, comprising through holes designated as either ON or OFF according to the position of the release lever 78.

In addition to requiring a special tool to engage and turn the brake release rod 68, another tool may be necessary for urging the indicator 76 backward to disengage it from the body 24 and allow the brake release rod 68 to turn. When the brake release rod 68 turns, the indicator 76 slides along the body 24, until it pops into a second through hole, locking the brake release 66 in the opposite setting (i.e., ON or OFF).

Referring to FIGS. 14A and 14B, exemplary special tools are shown. FIG. 14A shows a brake release key 84, in a T-shape like the proposed brake handles 64 for ease of use that engages the brake release rod 68 at the notch 80 through the access port 74. Due to the resilience of the biasing force of the indicator 76, torsional force from the brake release key 84 may not be enough to disengage the indicator 76 and allow the brake release rod 68 to turn. Referring to FIG. 14B, an indicator pusher 86 is provide for bringing the indicator 76 flush with the body 24 and allowing the indicator 76 to slide along the body 24 as the brake release rod 68 is turned, until it seats in the ON or OFF position.

Figure 15:
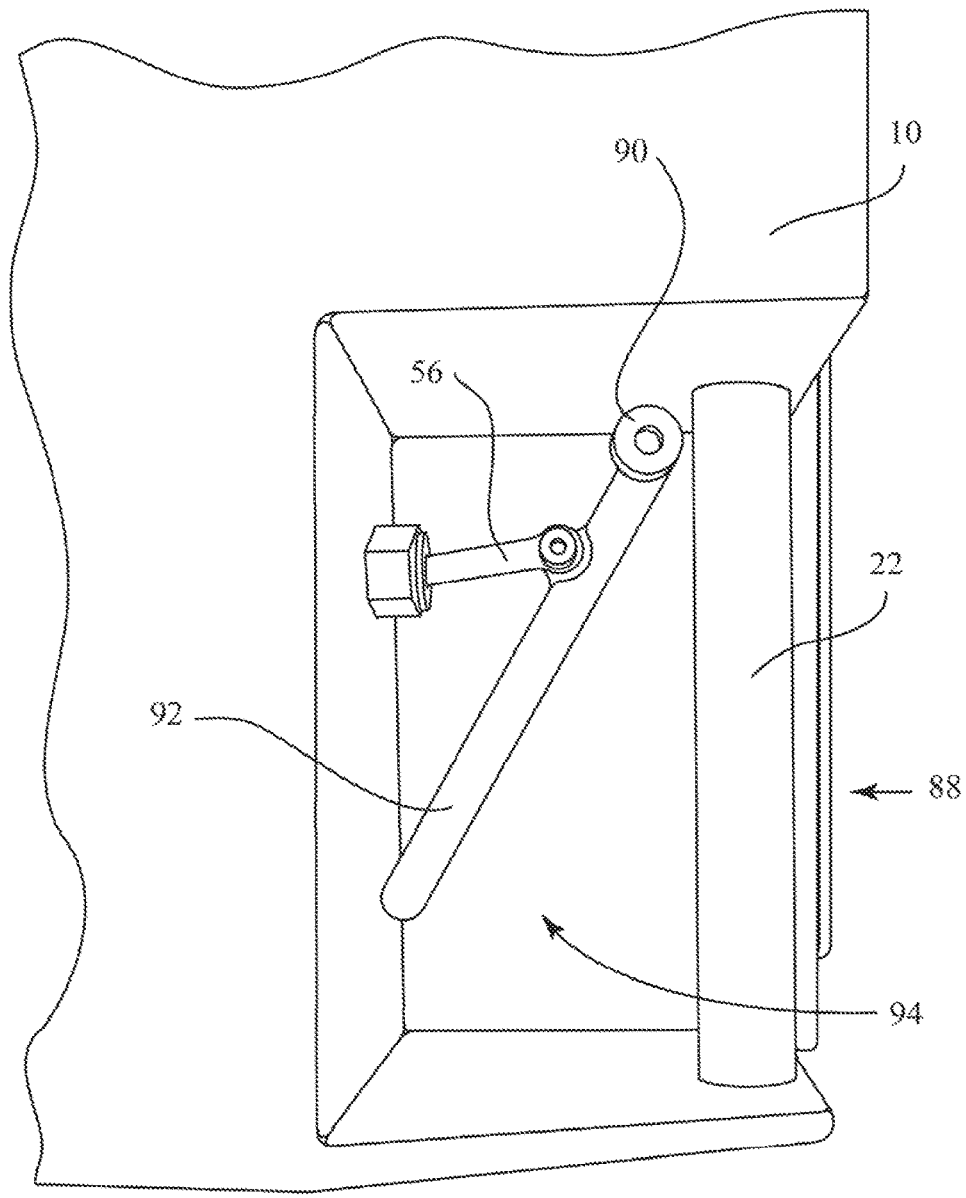
FIG. 15 is a top perspective view of a handle mechanism requiring reduced torque.

Referring to FIG. 15, a reduced torque handle 88 is shown. Because of the heavy weight carried by the mobile currency vault 10, substantial pressure may need to be placed on the brake cable 56 in order to disengage the interference beam 50 (not shown) from the brake gear 40 (not shown). Because pulling the brake cable 56 may be difficult with the brake handle 54, a reduced torque handle 88 is provided. The reduced torque handle 88 includes a post 90 from which a lever 92 extends. Preferably the lever 92 extends across a recess 94 into which the cart handle 22 is anchored. In this manner the lever 92 can be easily reached by a user's fingers while still maintaining control of the currency vault 10.

Still referring to FIG. 15, to reduce torque, the lever 88 is attached at one end to the post 90, and the brake cable 56 is attached substantially inward from the post 90. Preferably the brake cable 56 is attached at a point sufficiently far away from the post 90 to provide the necessary movement for disengaging the interference beam 50 from the brake gear 40, but close enough to the post, so that when a person applies pressure on the lever 92 opposite the post 90, less pressure is needed than simply pulling the brake cable 56 out toward the user without assistance. The spring-loaded nature of the interference beam 50 ensures that the lever 92 returns to its starting position when released.

The foregoing description of the preferred embodiment of the Invention is sufficient in detail to enable one skilled in the art to make and use the invention. It is understood, however, that the detail of the preferred embodiment presented is not intended to limit the scope of the invention, in as much as equivalents thereof and other modifications which come within the scope of the invention as defined by the claims will become apparent to those skilled in the art upon reading this specification.

I claim:

1. A brake mechanism for mobile currency vaults, comprising:
   a braking gear coupled to a wheel of the mobile currency vault;
   the braking gear governing rotational movement of the wheel and having a plurality of teeth;
   an interference tab depending downward from an interference beam extending through a fork of the wheel, the interference tab biased to an interference fit between the teeth and movable under tension to disengage from the braking gear;
   a brake control adjacent a handle of the mobile currency vault, the handle providing steering control of the mobile currency vault;
   the brake control in communication with the interference tab by a connection housed within the mobile currency vault;
   wherein a user must activate the brake control in order to disengage the interference tab from the braking gear to allow the wheel to rotate; and
   a brake release control activated by a key and an indicator pusher.

2. The brake mechanism of claim 1 wherein the wheel and the braking gear are located adjacent a bottom front portion of the mobile currency vault.

3. The brake mechanism of claim 1 wherein the wheel and the braking gear are housed between a non-swiveling fork.

4. The brake mechanism of claim 1 wherein the teeth have pressure angles substantially perpendicular to the wheel.

5. The brake mechanism of claim 1 further comprising a fillet at a base of the brake gear teeth between a tooth flank and a bottom land disposed at substantially ninety degrees.

6. The brake mechanism of claim 1 wherein the interference beam is hingedly coupled to the fork.

7. The brake mechanism of claim 1 wherein the connection is a sleeved cable.

8. The brake mechanism of claim 1 wherein the connection spans a lower front portion and an upper rear portion of the mobile currency cart.

9. The brake mechanism of claim 1 wherein the brake control is a T handle.

10. The brake mechanism of claim 1 further comprising a brake release for locking the brake mechanism in a disengaged position.

11. The brake mechanism of claim 10 wherein the brake release is coupled to the interference tab when activated.

12. The brake mechanism of claim 10 wherein the brake release spans the mobile currency vault from a front wheel to a rear handle.

13. The brake mechanism of claim 10 wherein the brake release mechanism comprises a brake release control at a rear end of the mobile currency vault.

14. A mobile currency vault, comprising:
   a body having a lower front end and an upper rear end;
   a wheel adjacent the lower front end;
   a braking gear coupled to the wheel;
   an interference tab depending downward from an interference beam extending through a fork of the wheel, the interference tab biased to engage the braking gear thereby preventing rotation of the wheel;
   a brake control adjacent the upper rear end, the brake control coupled to the interference tab and movable from a resting position to an actuated position;
   wherein moving the brake control from the resting position to the actuated position disengages the interference tab from the braking gear, thereby allowing the wheel to turn; and
   a key and indicator pusher for activating the release mechanism.

15. The mobile currency vault of claim 14 wherein the wheel is mounted on a stationary caster.

16. The mobile currency vault of claim 14 wherein the interference beam is hingedly coupled to the fork.

17. The mobile currency vault of claim 14 wherein the brake control is coupled to the interference tab by a cable inside the mobile currency vault.

18. The mobile currency vault of claim 14 further comprising a release mechanism for disengaging the interference tab from the braking gear.

* * * * *